Figure 1:
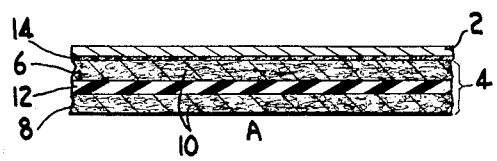

Oct. 2, 1962  C. H. HELBING ET AL  3,056,707
SOUND DEADENER AND ABSORBER
Filed Oct. 28, 1957

INVENTORS
CLARENCE H HELBING and
JACK H. WAGGONER
BY
Oscar L Spencer
ATTORNEY

United States Patent Office 3,056,707
Patented Oct. 2, 1962

3,056,707
SOUND DEADENER AND ABSORBER
Clarence H. Helbing, Shelbyville, Ind., and Jack H. Waggoner, Newark, Ohio, assignors to Pittsburgh Plate Glass Company, a corporation of Pennsylvania
Filed Oct. 28, 1957, Ser. No. 692,925
15 Claims. (Cl. 154—44)

This invention relates to an article having unusual sound deadening, sound absorption and sound transmission characteristics. It has particular relationship to a sound deadening and sound absorbing article which is useful in combination with vibratile structures such as vibratile sheet metal structures which are employed in the automotive industry.

Sound deadening is the reduction in sound emitted from a vibrating body due to reduction in the vibration of that body. Several methods of deadening noise caused by vibrating sheet metal are presently employed in the automotive industry. One of these methods involves a spray application of a sound deadener made up of a bituminous composition containing sand or other filler material. These materials are commonly referred to as spray-on deadeners, and are used extensively on the underneath sheet metal surfaces of an automobile body. Asphalt impregnated felts are also widely used as sound deadeners. These felts are cemented or otherwise attached to the sheet metal structure which is to be sound deadened.

The use of the above materials and various combinations thereof has proved unsatisfactory for a number of reasons. The spray-on deadener composed of a bituminous composition containing a filler is not practical because the nature of the material involves serious problems in application, high flammability, drying, cracking of the dried coating, shrinking, loss of adhesion, particularly at high temperature, brittleness at low temperatures, poor deadening performance at extremes of temperature, staining of upholstery, and numerous other difficulties. When combinations of these materials are employed, other problems such as multiple application must be dealt with.

Furthermore, these sound deadener materials, when employed alone or in various combinations with themselves or other materials, do not have satisfactory sound deadening properties in the practical range of application weights. For one thing, it is difficult to obtain uniformity of sound deadening with them over a range of temperatures.

It is also desired in various vehicles such as automobiles, airplanes and trains to provide a material which will absorb sounds created within or entering the vehicle. Thus a material which will function both as a sound deadener and a sound absorber is highly desirable for application to the doors, ceilings and sides of automobiles, air planes and trains. The above-mentioned spray-on deadeners and asphalt impregnated felts are very poor sound absorbers and thus do not satisfactorily serve a dual purpose as a sound deadener and absorber.

It is known that a porous glass fiber blanket, per se, is useful as a sound absorber. One or more blankets of glass fibers may be suspended in spaced relation to the roof of an automobile to absorb sounds created within the automobile. Blankets of glass fibers adhered together by a septum layer of binder and suspended from the roof of an automobile in spaced relation to the roof are ineffective in deadening sounds created by the vibration of the metal roof of an automobile. This method of mounting the blanket is, however, satisfactory for absorbing sounds within the vehicle.

An object of the present invention is the provision of an article which is both a good sound absorber and sound deadener as well as being resistant to sound transmission. A further object of the invention is the provision of such an article which is inexpensive and which is easily installed in an automobile roof.

An additional object of the invention is the provision of an article which is a good sound deadener and sound absorber and which does not stain upholstery when installed in an automobile or other vehicle.

In accordance with the present invention an article providing good sound deadening and vibration damping has been produced which, in addition, also acts as a good sound absorber and has a satisfactory resistance to sound transmission. This article is comprised of a plurality of porous, flexible, compressible, resilient blankets such as glass fiber blankets having a substantially continuous interlayer of sufficient weight to make the combination act as a sound deadening article. The interlayer is attached to the surfaces of the blankets and is preferably slightly impregnated therein so as to incorporate some of the fibers adjacent the surfaces of the blankets within the interlayer. Conventional adhesives may be employed to adhere the interlayer to the fibrous layer or they may be mechanically bound together.

One manner in which sound energy, or vibratory energy, is deadened is by its transformation into heat energy. External friction and internal friction are usually the means of dissipation. A special case is "mechanical hysteresis" which is especially useful in sound deadeners. This is a shock absorber effect in which the material yields to the push of the vibration but comes back slowly, dissipating the sound energy in internal friction.

These principles are utilized in the present invention to achieve sound deadening as the fibers are flexed and return to their original bound position. Sound energy is dissipated by external friction in the practice of the present invention as the portions of the blanket rub against each other during the flexing of the blanket. The internal friction created when the fibers flex also transforms sound energy into heat energy.

A further embodiment of the invention involves the use of an improved material as the septum or interlayer. This improved material is comprised of a mixture of a heavy granular filler material such as sand supported in substantially continuous layer form by a non-bituminous, organic, resinous binder such as an unvulcanized rubbery latex, for example, an unvulcanized copolymer of butadiene and styrene. A special form of this material contains particles of vulcanized rubber. The material may be applied to the surfaces of the blankets by spraying or other means, however, it has been found that spreading one form of the material on the surfaces of the blankets with a series of doctor blades is most effective. This enables the material to slightly impregnate the blanket and become integral with at least the surface of the blanket. When the sound deadener layer is doctored on the blankets, it preferably is in the form of an aqueous slurry and contains other materials such as viscosity controlling agents which enable it to be doctored uniformly on the surface of the porous blanket.

Figure 2:
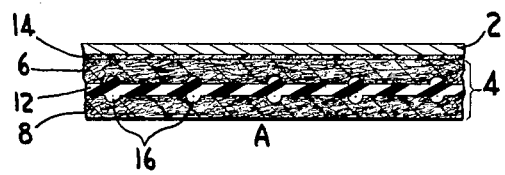

The sound deadening and absorbing article of the present invention is shown in the accompanying drawing in which:

FIGURE 1 is a view in vertical section of the sound deadening and absorbing article, and
FIGURE 2 is a view in vertical section of another embodiment of the article of FIGURE 1.

The sound deadening and absorbing article of the present invention is shown in FIGURE 1 in combination with vibratile sheet metal 2. The sound deadening and absorbing article 4 as shown in the drawing is composed of two porous, fibrous blankets 6 and 8 of individual glass fibers 10 arranged haphazardly in mat or blanket form and held in relationship to each other by a binder material such as a thermosetting phenol formaldehyde resin or other conventional resinous binder used in the mineral fiber or glass fiber industry. The fibrous blankets 6 and 8 may have the fibers arranged haphazardly or in a definite pattern, but the blankets are quite springy or flexible in their make-up. A substantially continuous interlayer 12 is positioned in between the fibrous blankets 6 and 8 in contact with their surfaces so as to slightly impregnate and combine with the fibers adjacent the surfaces of the blankets of glass fibers.

The sound deadening article 4 preferably is employed in conjunction with the vibratile material 2 so that the layer 6 of glass fibers is in substantially continuous contact with the sheet metal surface and is in between the sheet metal surface and the interlayer 12. The sound deadening article 4 is adhered to the sheet metal by a suitable adhesive material 14 which may provide a substantially continuous or a discontinuous bond between the article 4 and the vibratile object 2. The area which is bonded must be sufficient to maintain the fibers in substantially continuous contact with the surface of the object 2.

Assuming that the sheet metal 2 forms part of the roof of an automobile or an airplane or similar vehicle, the sound deadening article 4 performs its acoustical functions by having the fibers of layer 6 flex and deaden the vibrations from sheet metal 2 and by having fibrous layers 6 and 8 in combination with the interlayer absorb sounds from the interior of the vehicle generally designated as "A" in the drawing, from the exterior of the vehicle and from the space between the interlayer and the sheet metal as created by the sheet metal. The interlayer resists the transmission of sounds originating outside of the vehicle as well as airborne sounds originating from the underside of the sheet metal 2. The size and type of fibers in blankets 6 and 8 may be the same or different and they may be arranged differently in each blanket, bearing in mind their primary functions set forth above. Also, the thickness and density of each layer of fibers may be the same or different.

The interlayer 12 is usually smooth and uniform; however, it may have various configurations such as shown in FIGURE 2 to achieve various sound deadening effects. The interlayer 12 may also have one or more openings (not shown) in it to assist in the sound absorption function of the sound deadening article. In FIGURE 2, the interlayer is shown as being non-uniform in thickness and having bumps or knobs 16 built up on the surfaces of the layer 12. The knobs 16 may simply be formed from the interlayer material itself or of other material such as granular filler material which will give additional mass and increased density at these points in the interlayer. The increased portions of mass permit increased deadening at selected frequencies. Various configurations, such as parallel ridges or the like may be employed in place of or in addition to the knobs 16 to provide different sound deadening and absorbing effects. The configurations may be made by extruding the interlayer onto the fibrous blanket or by using a doctor blade having spaced notches along the doctoring edge to spread the slurry on the blanket. Apparatus suitable for application of the interlayer is shown in copending application Serial No. 681,362, filed August 30, 1957, by Clarence H. Helbing, now U.S. Patent No. 2,989,422.

In the manufacture of the improved acoustical article, commercially available blankets of glass fibers may be employed. Such blankets are conventionally formed as shown in U.S. Patents Nos. 2,489,242, 2,489,243 or 2,624,912 by directing a high temperature, high velocity gaseous blast against a solidified rod or molten stream of glass to attenuate the glass to extremely fine fibers, preferably below 7 microns in diameter and of indeterminate length. However, fibers of larger diameter and various lengths may be employed to form the mat. Usually these fibers are collected on a collecting belt and built up to various thicknesses. The individual fibers are held in place by a binder material which is applied to the fibers as they are being formed or collected or after they have been collected.

It has been found that the density of the fibrous blanket should be about 0.1 to 5 pounds per cubic foot and the thickness should be about 1/16 to 2 inches to achieve good sound deadening and absorbing in accordance with this invention. Blankets of greater thickness and density may be employed for special situations, for example, where the vibratile object is very thick and very heavy, such as the metal wall of a submarine. In such instance, the weight or surface density of the interlayer is also much greater.

The fibers have an average fiber diameter between 0.5 to 6 microns and vary from less than about 1 inch to 10 or more inches in length. The fibers are arranged haphazardly with respect to each other and are bound in such relationship by a thermosetting resinous binder such as phenol, urea or melamine formaldehyde constituting about 20 percent by weight of the fibers and binder. Other binders may be used including thermoplastic resins and inorganic substances such as sodium silicate. The amount of binder may range from 10 to 35 percent by weight based upon the total weight of the fibers and binder. Porous blankets useful in the present invention have a noise reduction coefficient of at least 0.20 when tested as described below by the Reverberation Room Method on test mounting No. 4 as set forth on page 6 of Bulletin XII, 1956, of the Acoustics Materials Association.

The glass fiber blankets set forth above may be used in sandwich form with various deadening interlayers to produce a combination sound absorber and sound deadener. The weight of the interlayer should be more than that provided by a mere adhesive layer between the blankets serving to hold them together and serving as a septum layer for additional sound absorption. The interlayer should be present in such amount that it is sufficient to provide substantial weight to the product so as to create substantial internal and external friction in the blanket 6 during flexing as described above. The weight or surface density of the interlayer should be at least one ounce per square foot and preferably 1 to 10 ounces per square foot. The weight of the interlayer may be greater for special situations as described above. A deadening effect equivalent to at least 25 decibels per second at 160 cycles per second should be achieved when the article is cemented substantially continuously over its whole surface to a vibratile test panel in a test method as described below in order to constitute the new product as an effective sound deadener.

In the examples below, layers of glass fibers about 1/4 inch in thickness and having a density of about 3/4 pound per cubic foot are employed. The fibers have an average fiber diameter between about 0.0001 and 0.0002 inch and range in length from about 1 to 10 inches. They are bonded together by about 20 percent of phenol formaldehyde resin based upon the weight of the fibers and resin. Interlayer materials prepared in the following manner were applied to the surfaces of several layers of glass fibers and assembled in sandwich-like form.

EXAMPLE I

An interlayer material was prepared by mixing 8 parts by weight of powdered, vulcanized rubber having an average particle size of 60 mesh with 20 parts by weight of sand having a particle size of 20 to 80 mesh. This dry mixture of powdered rubber and sand was then added gradually to 29 parts by weight of an aqueous latex dispersion containing an unvulcanized butadiene-styrene copolymer. The ratio of the butadiene to the styrene in the copolymer was 33 to 67 on a weight basis.

This mixture was then spread on the surface of a blanket of glass fibers with the aid of doctor blades so as to provide a layer of about 1/8 inch in thickness. An additional layer of glass fibers was then placed on the interlayer and pressed slightly thereinto so as to provide a sandwich with the interlayer material being in between two layers of glass fibers. The interlayer material slightly impregnated the surfaces of the two layers of fibers.

The composite item was then dried overnight at room temperature. The finished article could be flexed without breaking the interlayer.

EXAMPLE II

A dry mixture composed of 8 parts by weight of powdered, vulcanized rubber having an average particle size of 60 mesh, 20 parts by weight of 20 to 80 mesh sand and 5 parts by weight of cement was prepared. This dry mixture was then added to 14 parts of weight of an unvulcanized butadiene-styrene copolymer. The final mixture was spread on a layer of glass fibers to form a uniform layer of about 1/8 inch in thickness and slightly impregnating the layer of fibers. Another layer of glass fibers was then placed on top of the prepared mixture to form a sandwich-like material. The composite item was dried overnight and provided excellent sound deadening effects.

EXAMPLE III

An interlayer material which was noted especially for its ease of application was prepared in the following manner: 126 grams of water and 28 grams of starch were stirred together and then heated to boiling so as to form a thick paste. To this mixture at 90° F. was added 28 grams of an aqueous emulsion of urea formaldehyde resin (50 percent solids) by stirring. The resulting mixture was then added to a mixture of 5.6 grams of vegetable oil and 0.9 grams of a polyethylene glycol ester of oleic acid. This mixture was then added to 110 grams of an unvulcanized butadiene-styrene copolymer.

A dry mixture of 129 grams of powdered, vulcanized rubber and 258 grams of sand was prepared and added to the above. To this final mixture was added 57 grams of an aqueous solution of ammonium chloride containing 19 percent by weight of ammonium chloride. The resulting composition was then doctored on the surfaces of several layers of glass fibers which layers were assembled to form a sandwich type article as described above. The sandwich was dried at a temperature of about 400° F. for about 10 minutes.

The addition of starch and urea formaldehyde as shown in Example III to the basic composition as set forth in Example I has been found to make the basic mixture much easier to handle and apply to the fibrous blanket. The preferred proportion of these materials when used with the essential ingredients as stated below ranges approximately 1 to 10 parts by weight of starch and 1 to 3 parts by weight of urea formaldehyde resin.

EXAMPLE IV

Another sound deadening interlayer containing sand, latex and methyl cellulose as the essential ingredients which was noted for its ease of application in the form of an aqueous slurry by means of a doctor blade was prepared in the following manner: A hot (180° F.) aqueous solution of methyl cellulose containing 36.2 pounds of methyl cellulose in 284.5 gallons of water was prepared. To this was added 84 grams of Dowicide A (sodium salt of ortho phenyl phenol), 64.6 pounds of surfactant Igepal CO–530 (polyoxyethylated) nonyl phenol) and 3.9 pounds of tetrasodium pyrophosphate in 4 gallons of water in that order. Of these ingredients, methyl cellulose increases the viscosity of the aqueous slurry and contributes some binding and film forming properties, Dowicide A is present in amount sufficient to prevent mildew and mold attack, Igepal CO–530 contributes wet stability and wets mineral fibers which are later added and tetra sodium pyrophosphate provides stability to the slurry by preventing premature setting up of the slurry before use.

Seven hundred twenty pounds of mineral fibers in the form of asbestos shorts were next added to the aqueous solution. The mineral fibers were added to increase the viscosity of the slurry and prevent bleeding of the slurry into the fibrous blanket. The mineral fibers also add to the workability of the slurry.

Six and seven-tenths pounds of carbon black and 947 pounds of an aqueous emulsion of an unvulcanized copolymer of 40 parts by weight butadiene and 60 parts by weight of styrene (48% solids) were then added to the aqueous slurry and mixed therein to serve as a black binder. Seventy-two hundred pounds of sand were next added to give mass to the slurry. Finally, 7 pounds of an acetone-diphenyl amine condensate (Vultex 2–V–6–C PRTB) were added to the slurry to act as an antioxidant. This material prevents the development of an irritating odor during the heating of the glass fiber-slurry sandwich to dry the slurry.

The slurry thus described had a viscosity of 90,000 to 160,000 centipoises as determined by a Brookfield viscosimeter RVF using a number six spindle rotating at 2 r.p.m. The slurry was applied as a uniform continuous coating of about 1/32 inch thickness on the surface of one glass fiber blanket and covered with another blanket of glass fibers. This sandwich was heated at a temperature of about 500° F. for 4 minutes to dry the sound deadening layer. The interlayer had a surface density of about 2.5 ounces per square foot.

In the above formulations, the essential ingredients, i.e., granular filler material and binder or support for the granular filler material may be employed in various ratios. Best results are obtained when they are employed in weight ratios of 10 to 30 parts by weight of binder, such as latex, and 10 to 100 parts by weight of granular filler material such as sand. About 1/4 to 1 part by weight of viscosity controlling agents, such as methyl cellulose to 100 parts by weight of filler material may be present depending upon the mode of application employed and the viscosity desired. Viscosity controlling agents other than methyl cellulose, for example, sodium alginate, the sodium salt of carboxy methyl cellulose, etc., may be employed.

Although the proportions of the various materials set forth above have been found to be preferable in the methods of application set forth in the examples, changes may be made therein to suit the particular method of application and type of and degree of sound deadening and absorbing desired.

Sand has been found to be the cheapest and simplest filler material to add mass to the interlayer. However, it is understood that other mass adding materials may be added in addition to or in place of the sand in accordance with metal oxide powders such as aluminum and aluminum and zinc oxides, limestone flour, mineral fibers such as asbestos shorts, etc. About 3 to 20 parts by weight of mineral fibers may be used with 100 parts by weight of sand as set forth above in a preferred form of the invention. This is illustrated in Example IV. The particle size of the filler material preferably varies between 20 to 80 mesh, however, larger or smaller particle size materials may be employed to get particular effects.

The latex material employed in the practice of the invention is preferably an unvulcanized butadiene-styrene copolymer in water emulsion form having approximately 45 to 60 percent solids. Other unvulcanized latices such as natural rubber latex and other synthetic latex materials are contemplated in combination with or in lieu of butadiene-styrene latex as described above. These latices include unvulcanized butadiene-acrylonitrile, butadiene-isobutylene, polysulfide rubbers, chloroprene, polyvinyl chloride, polyvinyl acetate, silicones and other synthetic unvulcanized latices. The latex has been found to be a preferred binder when the interlayer 12 is applied to the blankets as an aqueous slurry by doctoring. The interlayer 12 which is formed with latex as the binder preferably is free from a vulcanizing agent and the latex performs the binding action without being vulcanized. The binder or support for the sand may take other forms such as resinous sheets to which the sand is adhered as shown in Example VIII below. Numerous rubbery or plastic sheets or binders are contemplated for this purpose.

Powdered, reclaimed rubber has been found to give good results in the practice of the invention. When employed it may be present in amount of up to 30 parts, preferably 1 to 10 parts by weight to 10 to 100 parts by weight of filler. Other forms of powdered, vulcanized, elastomeric material are contemplated including various powdered, vulcanized natural rubber and synthetic rubbers such as powdered, vulcanized polymers of butadiene-styrene, butadiene-acrylonitrile, butadiene-isobutylene, polysulfides, polyisobutylene, chloroprene, silicones and other powdered, vulcanized, rubbery materials.

The following samples were made and tested to illustrate the nature of the new product and its multiple capacity as a sound absorber and sound deadener and a barrier to sound transmission. The samples were produced using 20 by 20 inch samples of the glass fiber blankets described for use in Examples I to IV.

EXAMPLE V

Two glass fiber blankets were adhered together by a rubbery adhesive. This interlayer was sprayed on one blanket and the blankets were adhered together. The resulting sandwich was approximately 0.5 inch thick and weighed about 47 grams.

EXAMPLE VI

Two glass fiber blankets were adhered together by an interlayer made in the manner set forth in Example III of the above-identified application and applied between the blankets in the manner described therein so as to slightly impregnate the surfaces of the blankets. Three samples were made. The resulting sandwiches were approximately 0.5 to 0.7 inch thick and weighed about 225 to 240 grams.

EXAMPLE VII

Two blankets of glass fibers were adhered to a Mylar (polyester) film approximately ¼ mil in thickness. Two samples were made. These samples had flock adhered to an outside surface of one glass fiber blanket. The samples weighed about 72 grams.

EXAMPLE VIII

Two blankets of glass fibers were adhered to a ¼ mil thick Mylar (polyester) film having adhered to its surface by an adhesive grains of sand in such an amount that the approximate weight of the sandwich was 222 grams and the thickness of the sandwich was approximately 0.6 inch. One blanket of the glass fibers had a layer of flock adhered to its outside surface. One sample was made.

EXAMPLE IX

Two blankets of glass fibers were adhered together by an interlayer made as described in Example IV. Two samples were made. The 20 by 20 inch samples were approximately 0.61 inch thick and weighed about 234 grams.

The samples as produced in Examples V to IX were tested at the Geiger and Hamme Laboratories, Ann Arbor, Michigan, by a free-vibration decay-rate technique known as the Geiger thick-plate test to determine their ability to deaden sounds created by a vibrating metal object. Each of the samples was cemented by a continuous layer of adhesive to a steel plate 20 by 20 by ¼ inch mounted horizontally in a thermal jacket on springs at the nodal points of vibration near the mid-points of the sides of the sheet. The steel plate was brought to thermal equilibrium at 70° F. and vibrated by magnetic excitation at the natural frequency of the plate, approximately 160 cycles per second. This excitation was stopped and the rate of decay of the sound radiated by the vibrating metal panel was measured for each of the samples. The sound decay rate of the bare steel panel was about one decibel per second. The results are expressed in the table below in decibels per second corrected to a frequency of 160 cycles per second. They were obtained by taking four readings of each sample and recording them by photographic means. The sound level adjacent to the panel antinode in the anechoic environment was displayed as a line on a cathode ray oscilloscope and its amplitude decay was photographed by a moving film camera over an increment of 9.8 decibels equal to $1/e$, for optimum accuracy. The average of the four readings is given as the test result.

*Table*

| Sample No. | Sound Deadening Value, Decibels/second |
|---|---|
| V. 1 | 5 |
| VI. 1 | 43 |
| VI. 2 | 43 |
| VI. 3 | 47 |
| VII. 1 | 12 |
| VII. 2 | 16 |
| VIII. 1 | 59 |
| IX. 1 | 63 |
| IX. 2 | 94 |

NOTE.—The higher the sound deadening value, the better the sound deadening effect.

It can be seen from these tests that the weight of the interlayer must be substantial in contrast to the weight of a mere adhesive layer in order to constitute the sandwich-like product of the present invention both a good sound deadener and a sound absorber. The interlayer must be heavy and preferably contain an inexpensive mass adding ingredient such as sand and a non-staining support or binder therefor in order to render the product useful as desired.

A sample of the article as produced in Example IV was tested to determine its ability to absorb sounds. Random-incidence sound absorption coefficients were measured at the Geiger and Hamme Laboratories by the Reverberation-Room Method. Measurements were taken at the standard test frequencies of 125, 250, 500, 1000, 2000 and 4000 cycles per second on 4 by 6 feet samples supported on test mounting No. 6 as set forth on page 6 of Bulletin XVI, 1956, of the Acoustical Materials Association.

The reverberation room is constructed of 12 inches thick masonry and has inside dimensions of 17 feet 9½ inches by 21 feet 11½ inches by 13 feet 5¾ inches providing 5260 cubic feet testing volume. A diffuse sound field is created in the room by the rotation at 12 r.p.m. of an 8 by 16 feet sheet aluminum reflector vane upon which are carried a loudspeaker and a microphone. A warbling of the test tones by plus or minus 11 percent of the frequency also aids in creating a diffuse sound field. The bare room absorption ranges from 16 sabins at 125 cycles per second to 70 to 150 sabins at 4000 cycles per second depending on the relative humidity.

The coefficient of sound absorption of the article is determined from the following formulas:

$$\alpha_s = \frac{A_2 - A_1}{S} + \alpha_F \quad (1)$$

$$A_2 - A_1 = \frac{(B_2 - B_1)}{1.085C} V \quad (2)$$

wherein $\alpha_s$ = sound absorption coefficient of sample
$\alpha_F$ = sound absorption coefficient of area of floor covered by sample
$A$ = sabins (square feet)
$B$ = decay rate (decibel/sec.)

$V$ = volume of room (cubic feet)
$S$ = area of sample (square feet)
$C$ = velocity of sound feet (feet/sec.)

with subscript 1 being used for the results obtained from the bare room and subscript 2 being used for results obtained with the sample in the room.

The results of these tests were as follows:

| Frequency (Cycles per second) | 125 | 250 | 500 | 1,000 | 2,000 | 4,000 | NRC |
|---|---|---|---|---|---|---|---|
| Coefficient $\alpha_s$ | 0.14 | 0.43 | 0.32 | 0.55 | 0.75 | 0.79 | 0.57 |

A sample of the article produced as described in Example IV was also tested at the Geiger and Hamme Laboratories to determine its resistance to sound transmission. Two rooms were employed with the reverberation room described above being the room where the sound was emitted. The sample, five by five feet, was mounted to cover an opening of the same dimensions in one wall of the room. The sides of the opening are located more than ½ wavelength distance from the adjoining walls.

The termination enclosure is on the opposite side of the sample from the reverberation room. It is semi-anechoic, containing a selected amount of absorption numerically equal to the sample area. The enclosure measures 6 by 6 by 4 feet inside, with the walls having an average transmission loss of 25 decibels in series with those of the reverberation room so that the attenuation of the flanking path is estimated to be about 75 decibels on the average. The time-average sound pressure level of a fixed termination microphone is taken to be the termination reading.

The sound attenuation through the sample is measured as the difference between the integrated sound pressure levels measured in the reverberant source room and the semi-anechoic termination enclosure determined in accordance with American Society of Testing Materials standard E90–55. The following results were obtained at the listed frequencies:

| Frequency (Cycles per second) | 125 | 177 | 250 | 354 | 500 | 706 | 1,000 | 2,000 | 4,000 | Average Attenuation. |
|---|---|---|---|---|---|---|---|---|---|---|
| Attenuation (Decibels) | 10 | 12 | 9 | 9 | 9 | 10 | 10 | 13 | 11 | 10.3. |

The above tests point out the acoustic properties of the article of the present invention. Articles of the type contemplated by the present invention have an NRC (noise reduction coefficient) of above about 0.35 (or 35%). The NRC is the arithmetic average of the sound absorption coefficients at 250, 500, 1000 and 2000 cycles per second. They also have a sound transmission attenuation of at least 8 decibels. The continuous interlayer 12 aids the porous blankets in absorbing and deadening sounds and also prevents substantial transmission of sounds through the article. The sound deadening article set forth above has been described in detail with respect to the interlayer and a blanket of glass fibers, however, it is contemplated that other flexible, compressible, resilient, porous, fibrous blankets composed of organic and/or inorganic fibers may be employed. These include woven fabrics, fibrous webs and the like made of mineral wool, silk, cotton, wool, jute, synthetic organic fibers such as rayon, nylon, etc. A plurality of blankets having more than one interlayer may be employed in special situations where special tuning effects are desired. Porous blankets of foamed plastics which have the same desirable characteristics and properties as the fibrous blankets are also contemplated. Moreover, the blankets may be made of different materials, i.e., one blanket being composed of glass fibers and another blanket being composed of polyurethane foam.

The article of this invention composed of porous blankets separated by a heavy, continuous interlayer in sandwich form provides a new sound deadening and sound absorbing article. This sound deadening and absorbing article gives high sound decay rates. It has value when used in parts of an automobile or other vehicle and furniture in conjunction with upholstering in that it does not stain the upholstery. Furthermore, it is particularly desirable for use in applications where one material is desired to achieve sound deadening, sound absorbing and to reduce sound transmission.

Although the present invention has been described with reference to specific details of certain embodiments thereof, it is not intended that such details shall be regarded as limitations on the scope of the invention except insofar as included in the accompanying claims. This application is a continuation-in-part of our copending application Serial No. 420,972, filed April 5, 1954, now abandoned.

We claim:

1. A sound deadening and absorbing article comprising a plurality of flexible, porous, fibrous blankets having a noise reduction coefficient of at least 0.20 and separated by a dense, heavy, substantially continuous interlayer having a surface density of at least one ounce per square foot and consisting essentially of an unvulcanized mixture of 10 to 30 parts by weight of powered, vulcanized rubber, 10 to 30 parts by weight of unvulcanized latex and 10 to 100 parts by weight of a granular filler material, said mixture being free from a vulcanizing agent, said article having a noise reduction coefficient of at least 0.35 and a sound deadening ability of at least 25 decibels per second at 160 cycles per second when tested as described.

2. A sound deadening and absorbing article comprising a plurality of flexible, porous, fibrous blankets having a noise reduction coefficient of at least 0.20 separated by a dense, heavy, substantially continuous interlayer having a surface density of at least one ounce per square foot and consisting essentially of an unvulcanized mixture of 10 to 30 parts by weight of powdered, vulcanized rubber, 10 to 30 parts by weight of an unvulcanized, elastomeric copolymer of butadiene and styrene and 10 to 100 parts by weight of a granular filler material, said mixture being free from a vulcanizing agent, said article having a noise reduction coefficient of at least 0.35 and a sound deadening ability of at least 25 decibels per second at 160 cycles per second when tested as described.

3. A sound deadening and absorbing article comprising a plurality of flexible, porous, fibrous blankets having a noise reduction coefficient of at least 0.20 separated by a dense, heavy, substantially continuous interlayer having a surface density of at least one ounce per square foot and adhered to and slightly impregnating the surfaces of the fibrous blankets, said interlayer consisting essentially of an unvulcanized mixture of 10 to 30 parts by weight of powdered, vulcanized rubber, 10 to 30 parts by weight of unvulcanized latex and 10 to 100 parts by weight of granular filler material, said mixture being free from a vulcanizinz agent, said article having a noise reduction coefficient of at least 0.35 and a sound deadening ability of at least 25 decibels per second at 160 cycles per second when tested as described.

4. A sound deadening and absorbing article comprising a plurality of flexible, porous, fibrous blankets having a noise reduction coefficient of at least 0.20 separated by a dense, heavy, substantially continuous interlayer having a surface density of at least one ounce per square foot and consisting essentially of an unvulcanized mixture of 10 to 30 parts by weight of powdered, vulcanized rubber, 10 to 30 parts by weight of an unvulcanized, elastomeric copolymer of butadiene and styrene, and 10 to 100 parts by weight of sand, said mixture being free from a vulcanizing agent, said article having a noise reduction coefficient of at least 0.35 and a sound deadening ability of at least 25 decibels per second at 160 cycles per second when tested as described.

5. A sound deadening and absorbing article comprising a plurality of flexible, porous, glass fiber blankets having a noise reduction coefficient of at least 0.20 separated by a dense, heavy, substantially continuous interlayer having a surface density of at least one ounce per square foot and consisting essentially of an unvulcanized mixture of 10 to 30 parts by weight of powdered, vulcanized rubber, 10 to 30 parts by weight of unvulcanized latex and 10 to 100 parts by weight of granular filler material, said mixture being free from a vulcanizing agent, said article having a noise reduction coefficient of at least 0.35 and a sound deadening ability of at least 25 decibels per second at 160 cycles per second when tested as described.

6. A sound deadening and absorbing article comprising a plurality of flexible, porous, glass fiber blankets having a noise reduction coefficient of at least 0.20 separated by a dense, heavy, substantially continuous interlayer having a surface density of at least one ounce per square foot and consisting essentially of an unvulcanized mixture of 10 to 30 parts by weight of powdered, vulcanized rubber, 10 to 30 parts by weight of an unvulcanized, elastomeric copolymer of butadiene and styrene, and 10 to 100 parts by weight of a granular filler material, said mixture being free from a vulcanizing agent, said article having a noise reduction coefficient of at least 0.35 and a sound deadening ability of at least 25 decibels per second at 160 cycles per second when tested as described.

7. A sound deadening and absorbing article comprising a plurality of flexible, porous, glass fiber blankets having a noise reduction coefficient of at least 0.20 separated by a dense, heavy, substantially continuous interlayer having a surface density of at least one ounce per square foot and adhered to and slightly impregnating the surfaces of the fibrous blankets, said interlayer consisting essentially of an unvulcanized mixture of 10 to 30 parts by weight of powdered, vulcanized rubber, 10 to 30 parts by weight of unvulcanized latex and 10 to 100 parts by weight of a granular filler material, said mixture being free from a vulcanizing agent, said article having a noise reduction coefficient of at least 0.35 and a sound deadening ability of at least 25 decibels per second at 160 cycles per second when tested as described.

8. A sound deadening and absorbing article comprising a plurality of flexible, porous, fibrous blankets having a noise reduction coefficient of at least 0.20 separated by a dense, heavy, substantially continuous interlayer having a surface density of at least one ounce per square foot and consisting essentially of an unvulcanized mixture of 10 to 30 parts by weight of powdered, vulcanized rubber, 10 to 30 parts by weight of unvulcanized latex and 10 to 100 parts by weight of a granular filler material, said mixture being free from a vulcanizing agent and said interlayer having openings therein, said article having a noise reduction coefficient of at least 0.35 and a sound deadening ability of at least 25 decibels per second at 160 cycles per second when tested as described.

9. An article of manufacture comprising a sheetlike, vibratile element having attached to a surface thereof, a sound deadening and absorbing article comprising a plurality of flexible, porous, fibrous blankets having a noise reduction coefficient of at least 0.20 separated by a dense, heavy, substantially continuous interlayer having a surface density of at least one ounce per square foot and consisting essentially of an unvulcanized mixture of 10 to 30 parts by weight of powdered, vulcanized rubber 10 to 30 parts by weight of unvulcanized latex and 10 to 100 parts by weight of granular filler material, said mixture being free from a vulcanizing agent and one of said fibrous blankets being positioned between the sound deadening material and the vibratile structure and being attached in substantially continuous, face to face, touching relationship with the vibratile element, said sound deadening and absorbing article having a noise reduction coefficient of at least 0.35 and a sound deadening ability of at least 25 decibels per second at 160 cycles per second when tested as described.

10. A sound deadening and absorbing article comprising a plurality of flexible, porous, resilient blankets having a noise reduction coefficient of at least 0.20, the blankets being separated by a dense, heavy, substantially continuous interlayer having a surface density of at least one ounce per square foot and consisting essentially of 10 to 100 parts by weight of a heavy, granular, filler material supported in layer form by 10 to 30 parts by weight of a non-bituminous, organic binder, said article having a noise reduction coefficient of at least 0.35 and a sound deadening ability of at least 25 decibels per second at 160 cycles per second when tested as described.

11. A sound deadening and absorbing article comprising a plurality of glass fiber blankets 1/16 to 2 inches thick and having a density of 0.1 to 5 pounds per cubic foot and a noise reduction coefficient of at least 0.20, said blanket being made up of fibers having an average fiber diameter of 0.5 to 6 microns and an average length of 1 to 10 inches bonded together by 10 to 35 percent by weight of a thermosetting resin based upon the weight of the fibers and the resin and a dense, heavy, substantially continuous interlayer having a surface density of at least one ounce per square foot and consisting essentially of 10 to 100 parts by weight of a heavy, granular, filler material supported in layer form by 10 to 30 parts by weight of a non-bituminous, organic binder, said article having a noise reduction coefficient of at least 0.35 and a sound deadening ability of at least 25 decibels per second at 160 cycles per second when tested as described.

12. An article of manufacture as described in claim 11 wherein the interlayer consists essentially of 10 to 100 parts by weight of sand supported in layer form by 10 to 30 parts by weight of an unvulcanized latex.

13. An article of manufacture comprising a sheet-like, vibratile element having attached to a surface thereof, a sound deadening and absorbing article comprising a plurality of flexible, porous, resilient blankets having a noise reduction coefficient of at least 0.20 separated by a dense, heavy, substantially continuous interlayer having a surface density of at least one ounce per square foot and consisting essentially of 10 to 100 parts by weight of a heavy, granular, filler material supported in layer form by 10 to 30 parts by weight of an organic binder, said acoustic article having a noise reduction coefficient of at least 0.35 and a sound deadening ability of at least 25 decibels per second at 160 cycles per second when tested as described and one of said blankets being positioned between the interlayer and the vibratile element and being attached in substantially continuous face to face, touching relationship with the vibratile element.

14. A sound deadening and absorbing article comprising a plurality of flexible, porous, resilient blankets having a noise reduction coefficient of at least 0.20 separated by a dense, substantially continuous interlayer having a surface density of at least one ounce per square foot, said article having a noise reduction coefficient of at least 0.35 and a sound deadening ability of at least 25 decibels per second at 160 cycles per second when tested as described.

15. A sound deadening and absorbing article comprising a plurality of glass fiber blankets 1/16 to 2 inches thick and having a density of 0.1 to 5 pounds per cubic foot and a noise reduction coefficient of at least 0.20, said blanket being made up of fibers having an average fiber diameter of 0.5 to 6 microns and an average length of 1 to 10 inches bonded together by 10 to 35 percent by weight of a thermosetting resin based upon the weight of the fibers and the resin and a dense, substantially continuous interlayer having a surface density of at least one ounce per square foot, said article having a noise reduction coefficient of at least 0.35 and a sound deadening ability of at least 25 decibels per second at 160 cycles per second when tested as described.

References Cited in the file of this patent

UNITED STATES PATENTS

| | | |
|---|---|---|
| 1,019,407 | Baekeland | Mar. 5, 1912 |
| 1,896,263 | Watkins | Feb. 7, 1933 |
| 2,036,467 | Ellis | Apr. 7, 1936 |
| 2,081,765 | Prudden | May 25, 1937 |
| 2,116,289 | Shepherd | May 3, 1938 |
| 2,240,014 | Peik | Apr. 29, 1941 |
| 2,323,936 | Roberts | July 13, 1943 |
| 2,391,515 | Richard et al. | Dec. 25, 1945 |
| 2,428,591 | Slayter | Oct. 7, 1947 |
| 2,450,911 | Park et al. | Oct. 12, 1948 |
| 2,584,959 | Yocom et al. | Feb. 5, 1952 |
| 2,600,843 | Bush | June 17, 1952 |
| 2,636,543 | Groskopf | Apr. 28, 1953 |
| 2,668,123 | Copeland | Feb. 2, 1954 |
| 2,768,091 | Cubberley | Oct. 23, 1956 |
| 2,778,405 | Stephens et al. | Jan. 22, 1957 |
| 2,794,756 | Leverenz | June 4, 1957 |
| 2,802,764 | Slayter et al. | Aug. 13, 1957 |
| 2,959,495 | Cubberley et al. | Nov. 8, 1960 |
| 2,989,422 | Helbing | June 20, 1961 |